US012725479B2

(12) United States Patent
Leland et al.

(10) Patent No.: US 12,725,479 B2
(45) Date of Patent: Sep. 1, 2026

(54) LOTTERY TICKET VENDING MACHINE WITH RANDOM TICKET SELECTION RELATED FEATURES

(71) Applicant: Brightstar Global Solutions Corporation, Providence, RI (US)

(72) Inventors: Raymond Leland, Warwick, RI (US); Apostolos D. Kallis, Barrington, RI (US); Medina Marie Topalian, East Greenwich, RI (US); Giancarlo Perrotta, Tampa, FL (US)

(73) Assignee: Brightstar Global Solutions Corporation, Providence, RI (US)

( * ) Notice: Subject to any disclaimer, the term of this patent is extended or adjusted under 35 U.S.C. 154(b) by 171 days.

(21) Appl. No.: 18/828,304

(22) Filed: Sep. 9, 2024

(65) Prior Publication Data

US 2026/0073750 A1 Mar. 12, 2026

(51) Int. Cl.

| | |
|---|---|
| ***G07C 15/00*** | (2006.01) |
| ***B65H 35/10*** | (2006.01) |
| ***G07F 17/32*** | (2006.01) |

(52) U.S. Cl.

CPC ........... *G07C 15/005* (2013.01); *B65H 35/10* (2013.01); *G07F 17/329* (2013.01)

(58) Field of Classification Search

CPC ....... B26F 3/00; G07C 15/005; G07F 17/329; G07F 17/42

See application file for complete search history.

(56) References Cited

U.S. PATENT DOCUMENTS

| | | | | | |
|---|---|---|---|---|---|
| 4,928,133 | A * | 5/1990 | Fulton | G07B 1/00 | 235/31 R |
| 5,222,624 | A * | 6/1993 | Burr | G07F 17/329 | 221/124 |
| 5,317,135 | A * | 5/1994 | Finocchio | G06Q 50/34 | 235/375 |
| 5,475,205 | A * | 12/1995 | Behm | G07D 7/12 | 235/440 |
| 5,791,990 | A * | 8/1998 | Schroeder | G07F 17/329 | 273/138.2 |

(Continued)

FOREIGN PATENT DOCUMENTS

| | | | |
|---|---|---|---|
| CN | 217443917 | U | 9/2022 |
| EP | 4443404 | A1 | 10/2024 |

(Continued)

OTHER PUBLICATIONS

Extended European Search Report, from corresponding European Patent Application No. 25197842.5 (8 pages), Feb. 13, 2026.

*Primary Examiner* — Chase E Leichliter

(74) *Attorney, Agent, or Firm* — Neal, Gerber & Eisenberg LLP

(57) ABSTRACT

A lottery ticket vending machine configured to determine a vending machine selected instant lottery ticket from available instant lottery tickets in a plurality of ticket drawers, cause a ticket burster to move to the ticket receipt position associated with the ticket drawer associated with the vending machine selected instant lottery ticket, and cause the ticket burster to dispense the vending machine selected instant lottery ticket from the ticket drawer associated with the vending machine selected instant lottery ticket.

20 Claims, 11 Drawing Sheets

(56) References Cited

U.S. PATENT DOCUMENTS 6,110,044 A * 8/2000 Stern .................... G07F 17/32 463/16
6,876,971 B1 * 4/2005 Burke .................... G06Q 20/04 705/14.1
6,899,621 B2 * 5/2005 Behm .................... A63F 3/0645 235/383
7,047,104 B2 * 5/2006 Perin, Jr. .................... G07F 9/026 283/903
7,118,478 B2 * 10/2006 Fayter .................... G07F 17/3248 235/462.07
7,328,838 B2 * 2/2008 Brosnan .................... G07F 17/3248 235/379
7,467,738 B2 * 12/2008 Woods .................... G07F 11/68 225/93
7,788,482 B2 * 8/2010 Irwin, Jr. .................... G07D 7/0047 713/176
8,033,905 B2 * 10/2011 Irwin, Jr. .................... A63F 3/0645 273/269
8,197,325 B2 * 6/2012 Wright .................... G07F 17/32 463/22
8,727,349 B2 * 5/2014 Hodges .................... G06F 7/588 273/269
9,064,368 B2 * 6/2015 Englman .................... G07F 17/3267
9,251,663 B1 * 2/2016 Sandvick .................... G07F 17/3258
9,443,397 B1 * 9/2016 Sandvick .................... G07F 17/3258
9,987,550 B2 * 6/2018 Nordby .................... G07F 17/3223
10,062,240 B2 * 8/2018 Breslo .................... G07F 17/3258
10,573,130 B2 * 2/2020 Breslo .................... G07F 17/3204
11,120,665 B2 * 9/2021 Breslo .................... G07F 17/3204
11,488,451 B2 * 11/2022 Giunti .................... G07F 17/3244
11,532,208 B2 * 12/2022 Tam .................... G07F 17/3262
11,545,000 B2 * 1/2023 Breslo .................... G07F 17/3211
11,847,895 B2 * 12/2023 Gotlieb .................... G07F 17/329
12,039,839 B2 * 7/2024 Clemenson .................... G07F 17/3251
12,080,132 B2 * 9/2024 Topalian .................... B26F 3/002
12,190,687 B1 * 1/2025 Kallis .................... G07F 7/04
12,450,970 B2 * 10/2025 Topalian .................... G07F 7/005
12,462,614 B2 * 11/2025 Bucci .................... G07B 3/04
12,462,629 B2 * 11/2025 Bucci .................... G07C 15/005
12,462,630 B2 * 11/2025 Quaranta .................... G07C 15/005
2003/0042317 A1 * 3/2003 Behm .................... G07D 7/026 235/487
2004/0023711 A1 * 2/2004 Knapp .................... G07C 15/005 463/17
2004/0176154 A1 * 9/2004 Finnochio .................... G07F 17/32 463/3
2004/0227000 A1 * 11/2004 Behm .................... A23J 3/14 235/487
2005/0262338 A1 * 11/2005 Irwin, Jr. .................... G07F 17/329 713/155
2006/0040726 A1 * 2/2006 Szrek .................... G07F 7/08 463/17
2006/0084489 A1 * 4/2006 Boehm .................... A63F 9/24 463/17
2006/0273156 A1 * 12/2006 Berm .................... A63F 3/0605 235/487
2007/0088459 A1 * 4/2007 Pollard .................... G07F 17/42 700/234
2009/0194988 A1 * 8/2009 Wright .................... G07F 17/32 283/94
2009/0197662 A1 * 8/2009 Wright .................... G07F 17/3244 463/31
2009/0227318 A1 * 9/2009 Wright .................... G07F 17/329 463/25
2009/0227320 A1 * 9/2009 McBride .................... G07F 17/329 463/17
2010/0093419 A1 * 4/2010 Wright .................... G07F 17/329 463/43
2010/0216543 A1 * 8/2010 Nulph .................... G07F 17/32 463/25
2010/0308071 A1 * 12/2010 Businger .................... G07F 17/42 221/46
2011/0105213 A1 * 5/2011 Irwin, Jr. .................... G07F 17/3241 101/483
2011/0165933 A1 * 7/2011 Guziel .................... G07F 17/3218 463/17
2012/0085777 A1 * 4/2012 Bucci .................... B65H 35/10 221/30
2013/0260856 A1 * 10/2013 Irwin, Jr. .................... G06Q 30/06 463/17
2014/0045568 A1 * 2/2014 Bennett, III .................... G07F 17/329 463/17
2014/0148235 A1 * 5/2014 Luciano, Jr. .................... G07F 17/329 463/17
2015/0279156 A1 * 10/2015 Omar .................... G07F 17/3225 463/22
2015/0310697 A1 * 10/2015 O'Hagan .................... G07F 17/329 463/17
2015/0339891 A1 * 11/2015 Kennedy .................... G07F 17/3272 463/25
2016/0019749 A1 * 1/2016 Irwin, Jr. .................... G06Q 20/20 463/17
2016/0042587 A1 * 2/2016 Federico .................... G07F 17/3239 463/17
2016/0225230 A1 * 8/2016 Hill .................... G07F 17/3255
2016/0240037 A1 * 8/2016 Robbins .................... G07F 17/329
2017/0004671 A1 * 1/2017 Connolly .................... G07F 11/44
2017/0018148 A1 * 1/2017 Behm .................... G06Q 20/20
2017/0053472 A1 * 2/2017 Ferron .................... G06Q 30/02
2017/0053494 A1 * 2/2017 Breslo .................... G07F 17/42
2017/0053495 A1 * 2/2017 Breslo .................... G07F 17/329
2017/0236371 A1 * 8/2017 Froelich .................... G07F 17/3241 463/17
2018/0012453 A1 * 1/2018 Anderson .................... G07F 17/3251
2018/0190065 A1 * 7/2018 Ghia .................... G07F 17/3202
2019/0287335 A1 * 9/2019 Sandvick .................... G06Q 50/34
2020/0265678 A1 * 8/2020 Breslo .................... G07F 17/3258
2022/0058915 A1 * 2/2022 Breslo .................... G07F 17/323
2022/0108562 A1 * 4/2022 Claude .................... G07F 17/329
2022/0114860 A1 * 4/2022 Mejenborg .................... G07F 17/3216
2023/0386303 A1 * 11/2023 Bettcher .................... G07G 1/0018
2024/0203204 A1 * 6/2024 Higgins .................... G07F 17/3241
2024/0321064 A1 * 9/2024 Bucci .................... G07F 17/3216
2026/0045132 A1 * 2/2026 Kallis .................... G07C 15/005
2026/0073750 A1 * 3/2026 Leland .................... G07C 15/005

FOREIGN PATENT DOCUMENTS

EP 4502973 A1 2/2025
EP 4535316 A1 4/2025
EP 4535317 A1 4/2025
EP 4535318 A1 4/2025

* cited by examiner

LOTTERY TICKET VENDING MACHINE WITH RANDOM TICKET SELECTION RELATED FEATURES

BACKGROUND

The present disclosure relates to lottery ticket vending machines with random ticket selection related features.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine comprising: a housing; a ticket drawer holder positioned in the housing, the ticket drawer holder comprising a plurality of ticket drawers, each of the ticket drawers configured to hold a pack of instant lottery tickets; a ticket receptacle supported by the housing; a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and a controller. The controller is configured to: randomly determine a vending machine selected instant lottery ticket from available instant lottery tickets in the plurality of ticket drawers, cause the ticket burster to move to the ticket receipt position associated with the ticket drawer associated with the vending machine selected instant lottery ticket, and cause the ticket burster to dispense the vending machine selected instant lottery ticket from the ticket drawer associated with the vending machine selected instant lottery ticket.

In various other embodiments, the present disclosure relates to a lottery ticket vending machine comprising: a housing; a ticket drawer holder positioned in the housing, the ticket drawer holder comprising a plurality of ticket drawers, each of the ticket drawers configured to hold a pack of instant lottery tickets; a ticket receptacle supported by the housing; a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and a controller. The controller is configured to: randomly determine a vending machine selected instant lottery ticket held by one the plurality of ticket drawers from a plurality of different lottery tickets held by the plurality of ticket drawers, cause a randomly determined sequences of movements of the ticket burster, cause the ticket burster to move to the ticket receipt position associated with the ticket drawer that holds the vending machine selected instant lottery ticket, and cause the ticket burster to dispense the vending machine selected instant lottery ticket from that drawer.

In various other embodiments, the present disclosure relates to a lottery ticket vending machine comprising: a housing; a ticket drawer holder positioned in the housing, the ticket drawer holder comprising a plurality of ticket drawers, each of the ticket drawers configured to hold a pack of instant lottery tickets; a ticket receptacle supported by the housing; a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and a controller. The controller is configured to: determine a non-randomly determined vending machine selected instant lottery ticket from available instant lottery tickets in the plurality of ticket drawers, cause a randomly determined movement of the ticket burster, cause the ticket burster to move to the ticket receipt position associated with the determined vending machine selected instant lottery ticket, and cause the ticket burster to dispense the vending machine selected instant lottery ticket.

Additional features are described in, and will be apparent from, the following Detailed Description and the figures.

DETAILED DESCRIPTION

Figure 1A:
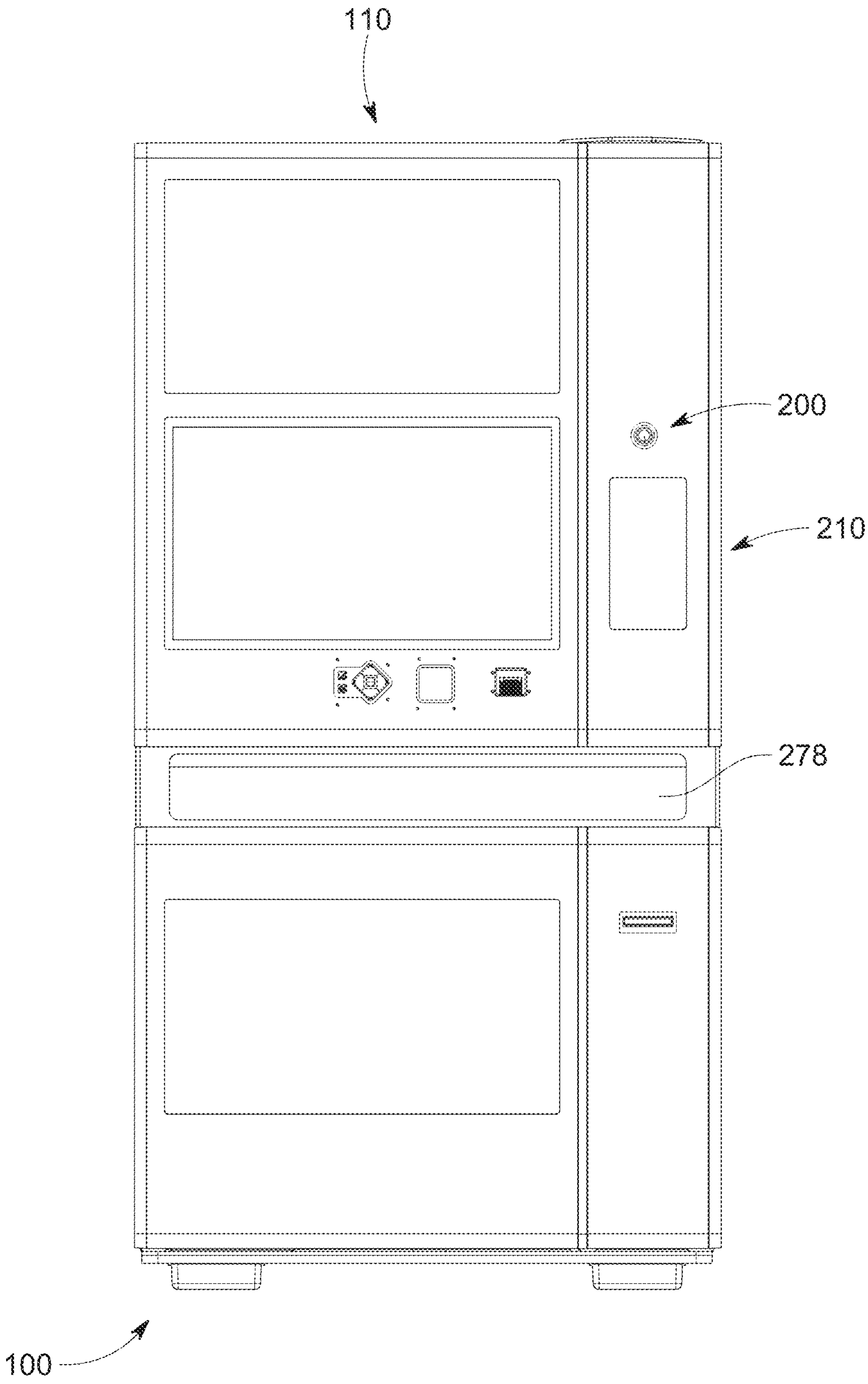
FIG. 1A is a front perspective view of a lottery ticket vending machine of one example embodiment of the present disclosure shown with a front door thereof in a closed position.
Figure 1B:
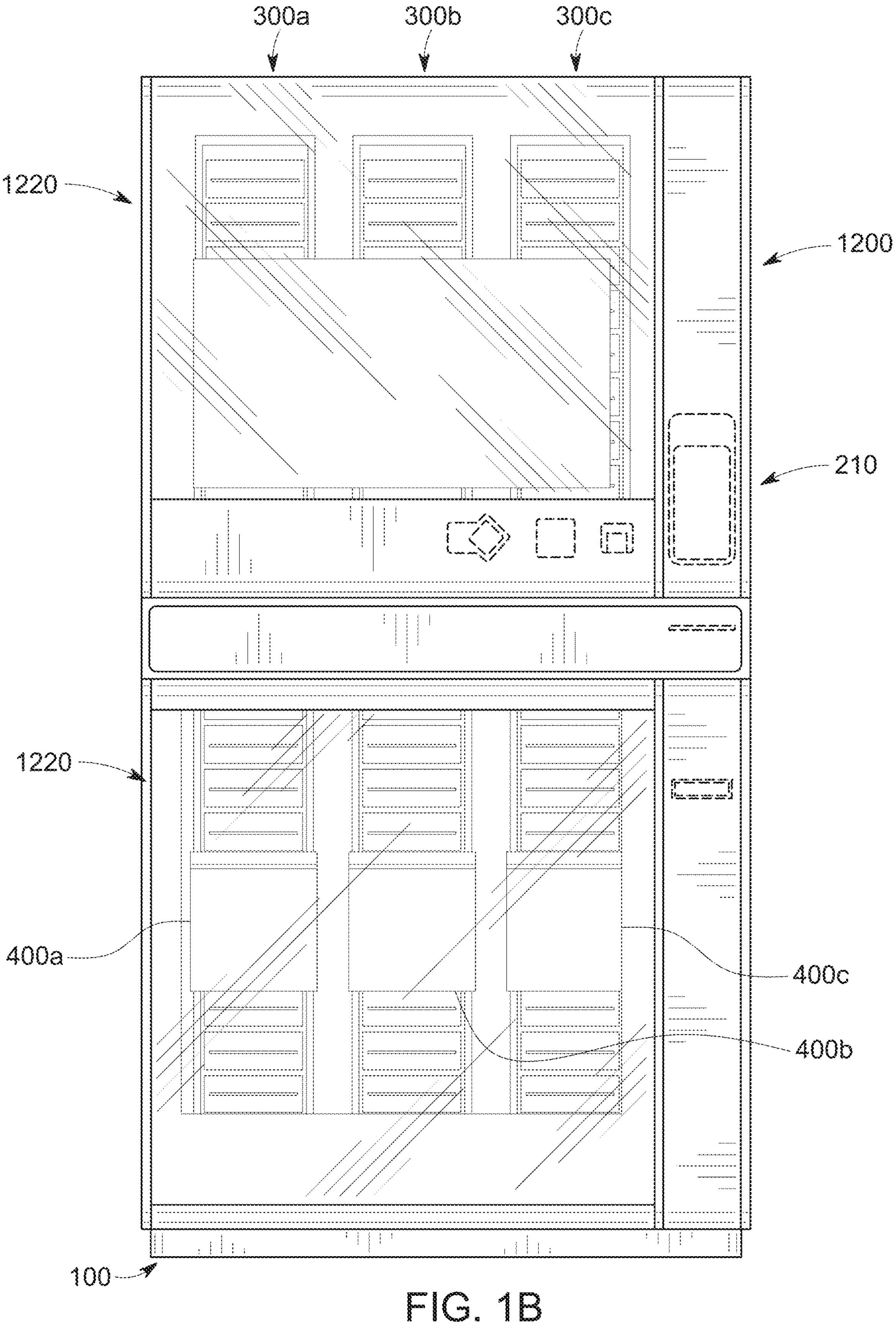
FIG. 1B is a front perspective view of a lottery ticket vending machine of another example embodiment of the present disclosure shown with a front door having a ticket display window.

In various embodiments, the present disclosure relates to a lottery ticket vending machine that includes one or more user input devices (such as but not limited to one or more user interfaces), one or more ticket bursters, and a plurality of ticket drawers.

In various embodiments, the lottery ticket vending machine is configured to: (1) enable a user to select one or more different instant lottery tickets to purchase via the user input device(s); and (2) responsive to each user selected and purchased instant lottery ticket, cause a burster of the lottery ticket to make one or more movements to obtain and dispense that instant lottery ticket.

In various embodiments, the lottery ticket vending machine is configured to: (1) enable a user to make one or more inputs via the user input device(s) requesting one or more vending machine selected instant lottery tickets based on one or more purchase parameters; (2) responsive to each user requested and purchased vending machine selected instant lottery ticket, select one or more of the different instant lottery tickets based on the purchase parameter(s); and (3) cause a burster of the lottery ticket vending machine to make one or more movements to obtain and dispense each vending machine selected instant lottery ticket.

In various embodiments, the lottery ticket vending machine can determine, cut, and dispense each vending machine selected instant lottery ticket based on the purchase parameter(s) and on one or more of: (1) a randomly selected lottery ticket; (2) a selected lottery ticket based on a predetermined order or pattern for selection of such lottery tickets; (3) a location of the selected lottery ticket and particularly the position of the lottery ticket drawer in the lottery ticket vending machine that holds that selected lottery ticket; (4) the initial position of the burster associated with that lottery ticket drawer; (5) a determination of what movements the burster needs to make to obtain that lottery ticket from that lottery ticket drawer and to dispense that lottery ticket; and (6) a determination of any additional movements that the burster will make before obtaining that lottery ticket from that lottery ticket drawer and dispensing that lottery ticket.

In various embodiments, after determining each vending machine selected instant lottery ticket, the lottery ticket vending machine: (1) causes zero, one, or more movements of the determined ticket burster to obtain that selected lottery ticket from the lottery ticket drawer that holds that instant lottery ticket; and/or (2) causes zero, one, or more movements of the ticket burster to dispense that obtained instant lottery ticket.

In various embodiments, after determining a vending machine selected instant lottery ticket, the lottery ticket vending machine additionally determines whether to move one or more of the other ticket bursters before or during the movement of the ticket burster. Based on that determination, the lottery ticket vending machine causes zero, one, or more movements of such other ticket burster(s) before the ticket burster obtains and dispenses the selected lottery ticket.

Thus, in various embodiments, (1) the vending machine selected instant lottery ticket can be randomly determined or otherwise suitably determined; (2) the one or more of the movements of the ticket burster that obtains and dispenses the vending machine selected instant lottery ticket can be randomly determined or otherwise suitably determined; and (3) the one or more of the movements of other the ticket burster that do not obtain or dispense the vending machine selected instant lottery ticket can be randomly determined or otherwise suitably determined.

In various embodiments, the lottery ticket vending machine: (1) determines if a user has selected a vending machine selected instant lottery ticket via the user interface; (2) causes a random movement of one or more ticket bursters before obtaining the vending machine selected lottery ticket; and (3) causes one or more ticket bursters to dispense one or more lottery tickets from the plurality of ticket drawers in association with the random burster movement feature.

For brevity, these different potential random determinations are sometimes referred to herein as a random burster movement or random burster movement feature.

In various embodiments, the lottery ticket vending machine is also configured to: (1) enable a user to select one or more different draw lottery tickets to purchase via the user input device(s); and (2) responsive to each user selected and purchased draw lottery ticket, cause a ticket dispenser to print and dispense the draw lottery ticket.

In various embodiments, the vending machine selected lottery ticket can additionally be a draw game lottery ticket for a draw lottery game. The present disclosure contemplates various embodiments for one or more draw game lottery tickets to be dispensed by the lottery ticket vending machine as part of the ticket selection and dispensing process (such as including causing a ticket burster associated with instant lottery tickets to make one or more movements before the lottery ticket vending machine dispenses the draw game lottery ticket). However, for purposes of this present disclosure, the description of various embodiments focus on instant lottery tickets to be dispensed by one or more movable ticket bursters. Such descriptions are not meant to limit the present disclosure.

In various embodiments, the user interface is configured to provide one or more ticket selection menus that include one or more vending machine selected lottery ticket options. Responsive to one or more inputs received from the user via the user interface, one or more controllers of the lottery ticket vending machine perform the vending machine lottery ticket selection and ticket providing processes (that can include the random burster movement feature to cause a random movement of one or more ticket bursters before obtaining and dispensing the vending machine selected lottery ticket).

In various embodiments, the one or more controllers are configured to: (1) randomly determine the vending machine selected instant lottery ticket responsive to the selection of the vending machine selected lottery ticket input; and (2) cause the ticket burster associated with the randomly determined vending machine selected instant lottery ticket to move to a ticket receipt position associated with the randomly determined vending machine selected instant lottery ticket to obtain the vending machine selected instant lottery ticket.

In various embodiments, the one or more controllers are configured to: (1) receive a ticket selection input from a user via the one or more ticket selection menus; (2) determine whether the ticket selection input is a selection of a vending machine selected lottery ticket; (3) responsive to the selection of the vending machine selected lottery ticket, determine a vending machine selected instant lottery from available instant lottery tickets of the plurality of ticket drawers; (4) cause one or more randomly determined movements of the ticket burster associated with the vending machine selected instant lottery ticket before obtaining and dispensing the vending machine selected lottery ticket; (5) cause the ticket burster associated with that ticket drawer to obtain and dispense the vending machine selected lottery ticket from that ticket drawer.

In various embodiments, the one or more controllers are configured to: (1) randomly determine the vending machine selected instant lottery; (2) cause the ticket burster associated with the randomly determined vending machine selected instant lottery ticket to move in a random sequence; and (3) cause the ticket burster associated with the randomly determined vending machine selected instant lottery ticket to move to a ticket receipt position associated with the randomly determined vending machine selected instant lottery ticket.

In various embodiments, the one or more controllers are configured to: (1) determine the vending machine selected instant lottery ticket with a non-random determination; (2) cause the ticket burster associated with the determined vending machine selected instant lottery ticket to move in a random sequence; and (3) cause the ticket burster associated with the determined vending machine selected instant lottery ticket to move to a ticket receipt position associated with the determined vending machine selected instant lottery ticket.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket barcodes, and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets attached to each other but joined by perforations. Such lottery tickets of a pack can be detached from each other along such perforations. While lottery tickets of each pack are often manufactured in a continuous strip that is fan-folded for convenient supply, the packs can be in other forms such as in a roll form. These packs in the fan-folded form or in the roll form are configured to be dispensed via a lottery ticket vending machine.

Lottery ticket vending machines can include various components such as but not limited to pinch rollers, stepper motors, and cutting blades to separate and dispense lottery tickets from a pack of lottery tickets, for example, within one or more ticket bursters. When a user purchases an instant lottery ticket, the ticket burster associated with a ticket drawer holding that purchased ticket moves into a ticket receipt position aligned with that ticket drawer to receive and dispense the purchased ticket.

Various embodiments of the present disclosure provide a lottery ticket vending machine that provides a user interface for selection of a vending machine selected lottery ticket (that can be associated with a random burster movement feature) that provides a sense of randomness and unpredictability to the user when purchasing a lottery ticket. For the random burster movement feature, the lottery ticket vending machine is configured to cause one or more random movements of one or more ticket bursters before dispensing the purchased vending machine selected lottery ticket, with the exact purchased ticket and thus potential award(s) being unknown to the user. The unknown potential award(s) and the random movement(s) provide a sense of anticipation of the ticket drawer of the plurality of ticket drawers at which the ticket burster will stop to obtain the purchased ticket. Various embodiments of the present disclosure contemplate that the random movement of the ticket burster can be a direct movement to a ticket drawer that holds a randomly determined vending machine selected instant lottery ticket, an indirect random movement to a ticket drawer that holds a randomly determined vending machine selected instant lottery ticket, and an indirect random movement to a ticket drawer that holds a non-randomly determined vending machine selected instant lottery ticket. In various scenarios, the random movement includes movement of the ticket burster over ticket drawers that hold instant lottery tickets that have not been selected, which can create excitement for the user when the ticket burster moves over ticket drawers that hold instant lottery tickets with high potential rewards.

Turning now to FIGS. 1A, 1B, 2, 3, 4, 5, 6, 7, 8, 9, and 10, a lottery ticket vending machine of one example embodiment of the present disclosure is generally illustrated and indicated by numeral 100. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer holders 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer holders and the ticket bursters can vary in accordance with the present disclosure. In certain embodiments, such as the example embodiment shown in FIG. 1B, a front door 1200 of the ticket vending machine 100 includes one or more ticket display windows 1220 that provide improved visibility of the ticket drawer holders 300*a*, 300*b*, and 300*c* and the ticket bursters 400*a*, 400*b*, and 400*c*.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components 210 that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket and the determination of any position issues of the lottery tickets (such as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components 210 include one or more display devices, one or more user input devices (e.g., buttons, keypads), and one or more payment acceptors. In various embodiments, the purchaser interface components 210 include a touch-screen display. The purchaser interface components 210 enable purchasers to use such components to determine the lottery tickets available from the ticket vending machine 100, and to select and pay for any of those lottery tickets held by the ticket vending machine 100 that the purchaser desires to obtain. The purchaser interface components 210 can display images and information to inform purchasers of the different lottery tickets available from the ticket vending machine 100 and to assist in completing the selection and purchase of such lottery tickets. These electronic components and purchaser interface components 210 can take many different forms as well known in the industry, and are thus not described in detail herein for brevity. In various embodiments, the purchaser interface components 210 are configured by one or more controllers of the ticket vending machine 100 to provide a user interface for a vending machine lottery ticket selection that can include a random burster movement feature, as described herein. For example, the user interface components 210 are configured to display the example user interface 500 and/or the example user interface 600 respectively shown in FIGS. 9 and 10.

Figure 2:
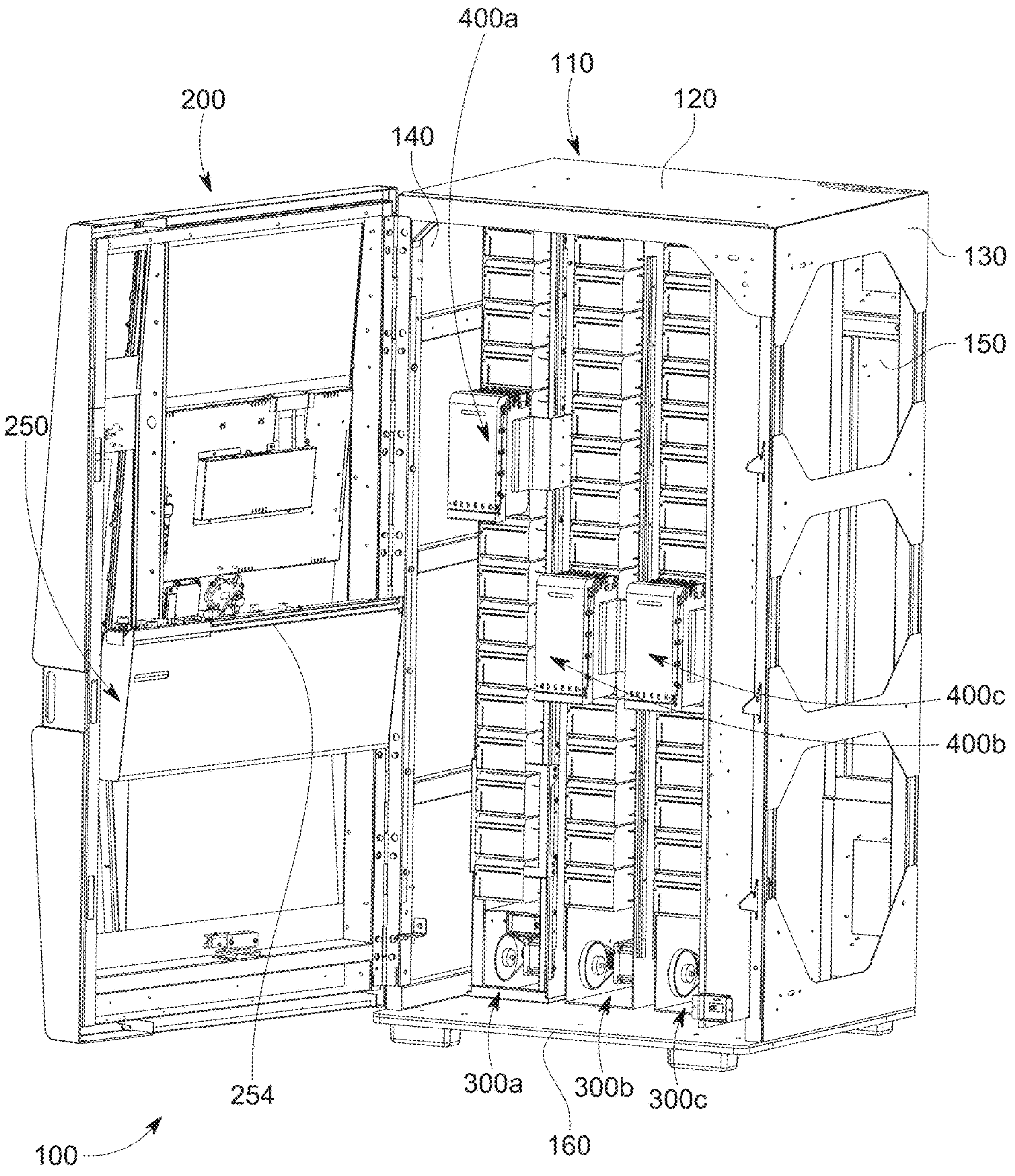
FIG. 2 is a front perspective view of the lottery ticket vending machine of FIG. 1A shown with the front door thereof in an open position, shown with a left side wall panel thereof removed, showing three ticket drawer holders and three movable ticket bursters respectively associated with the three ticket drawer holders, and showing a ticket collection receptacle of the front door.
Figure 3:
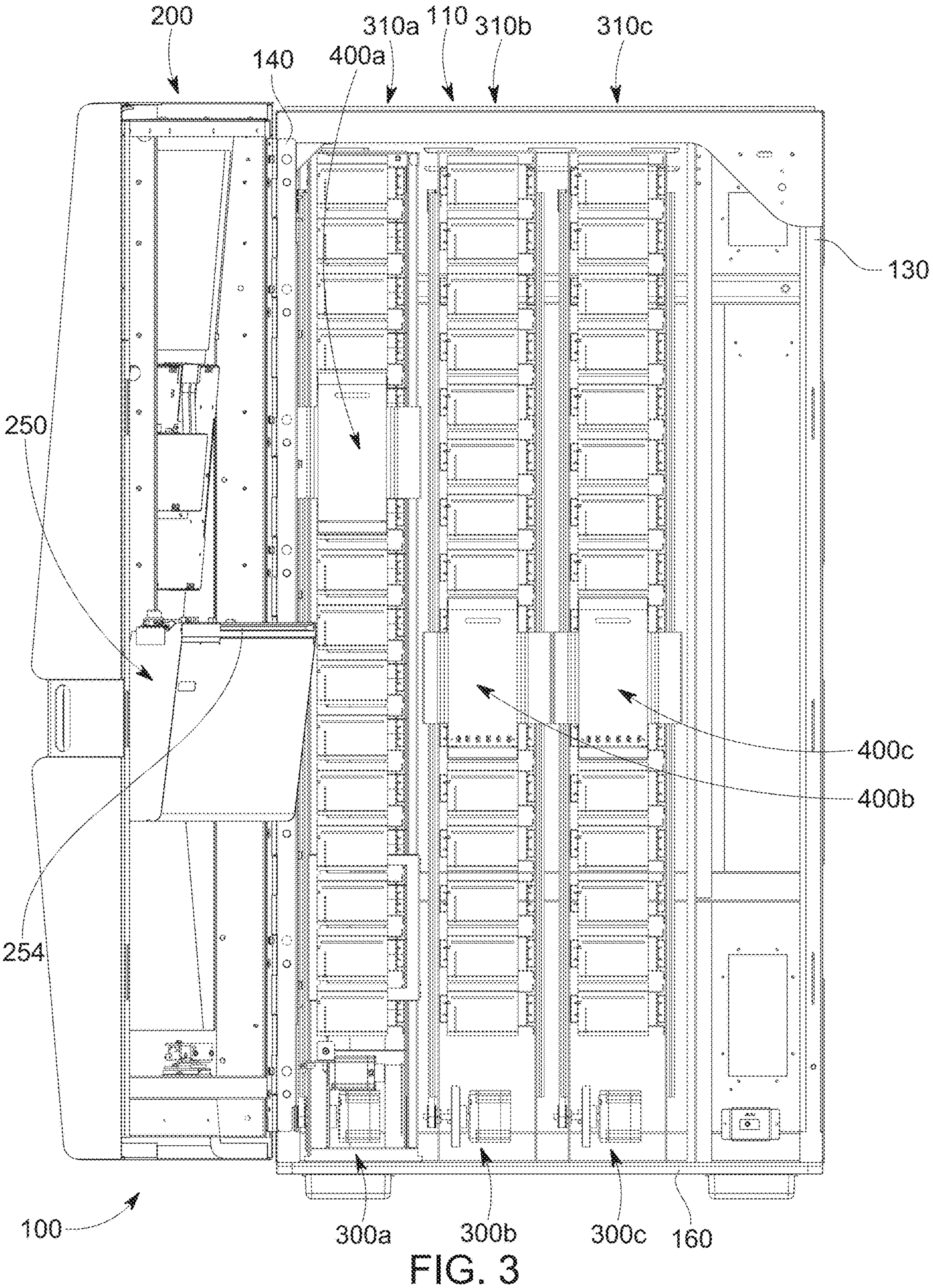
FIG. 3 is a front view of the lottery ticket vending machine of FIG. 1A shown with the front door thereof in the open position, shown with the left side wall panel thereof removed, showing the three ticket drawer holders and the three movable ticket bursters respectively associated the three ticket drawer holders, and showing the ticket collection receptacle of the front door.
Figure 4:
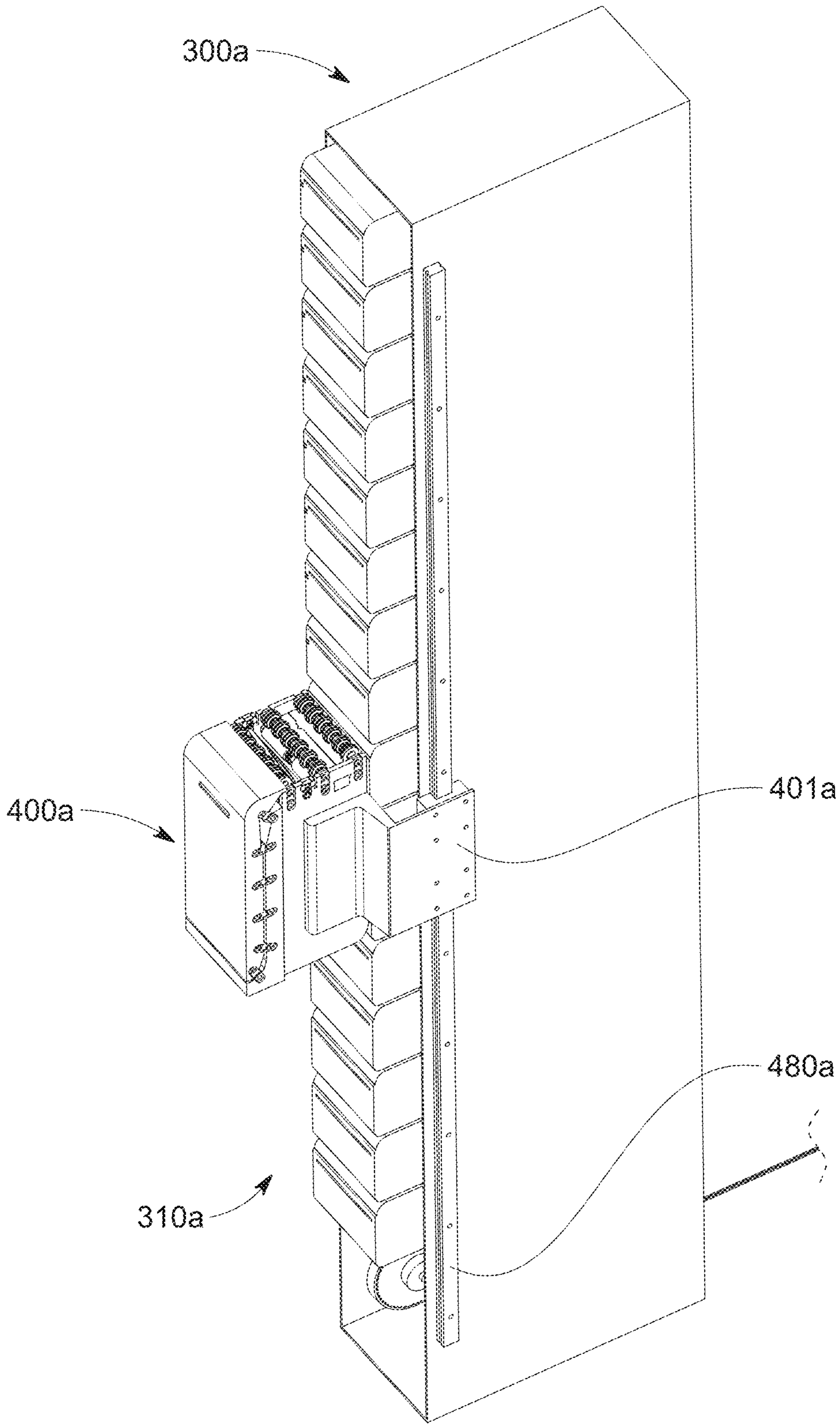
FIG. 4 is an enlarged fragmentary perspective view of one of the ticket drawer holders and the ticket burster associated with that ticket drawer holder of the lottery ticket vending machine of FIG. 1A shown removed from the lottery ticket vending machine.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer holders 300*a*, 300*b*, and 300*c*. The front door 200 is moveable from a closed and locked position covering the open front face of the machine housing 110 as shown in FIG. 1A to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components 210 (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending purchase ticket retrieval slot 278 (best seen in FIG. 1A). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer holders 300*a*, 300*b*, or 300*c*. The position, size, and configuration of the ticket collection receptacle can vary in accordance with the present disclosure.

Each of the ticket drawer holders 300*a*, 300*b*, and 300*c* are identical in this example embodiment. For brevity, only ticket drawer holder 300*a* is described in detail herein. Likewise, the three movable ticket bursters 400*a*, 400*b*, and 400*c* are identical in this example embodiment. For brevity, only ticket burster 400*a* associated with the ticket drawer holder 300*a* is described herein.

Ticket drawer holder 300*a* includes a plurality of aligned ticket drawers 310*a* that are vertically stacked in the holder. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets such as instant lottery tickets for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each instant lottery ticket held by that ticket drawer into the associated ticket burster 400*a* when the ticket burster 400*a* is moved into alignment with such ticket drawer (e.g., at a respective ticket receipt position) for receipt, bursting, and dispensing of that lottery ticket. This ticket movement can be caused by an actuation lever of the burster engaging a ticket movement assembly of the ticket drawer, or in another suitable manner. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets fed by the ticket drawers in the ticket drawer holder 300*a* into that ticket burster 400*a*.

As shown in FIGS. 2, 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer holder 300*a*. Each of the burster supporters also support the ticket burster 400*a* in a manner that enables the ticket burster 400*a* to vertically move to into alignment with the ticket receptacle 250.

In various embodiments, the burster supporter can be any suitable structure that supports the ticket burster 400*a* and enables the ticket burster 400*a* to move to any of the different ticket receipt positions that are associated with and in alignment with the different respective ticket drawers 310 (e.g., ticket drawers 310*a* of the ticket drawer holder 300*a*, ticket drawers 310*b* of the ticket drawer holder 300*b*, and ticket drawers 310*c* of the ticket drawer holder 300*c*), and the ticket receptacle 250 if needed. For example, the ticket burster supporter can include a suitable XY gantry that supports the ticket burster 400*a* and enables the ticket buster 400*a* to move to any of these respective ticket receipt positions. In various such embodiments, the ticket vending machine 100 includes only one ticket burster 400*a* that is movable to any of the respective ticket receipt positions. In various such embodiments, the ticket vending machine 100 includes one active ticket burster and one or more inactive ticket bursters that are configured for use if the active ticket burster is unavailable (e.g., inoperable due to malfunction, removed for maintenance).

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer holder 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer holder 300*a* such that the ticket burster 400*a* is positioned to receive one or more of the lottery tickets stored in each respective ticket drawer of the ticket drawer holder 300*a* for obtaining and dispensing that instant lottery ticket into the ticket receptacle 400 for the purchaser as requested by the purchaser. In various embodiments, the actuators are configured to move the ticket burster 400*a* under the control of the controller(s) in both the vertical (e.g., up and down) directions and horizontal (e.g., left and right) directions.

Figure 5:
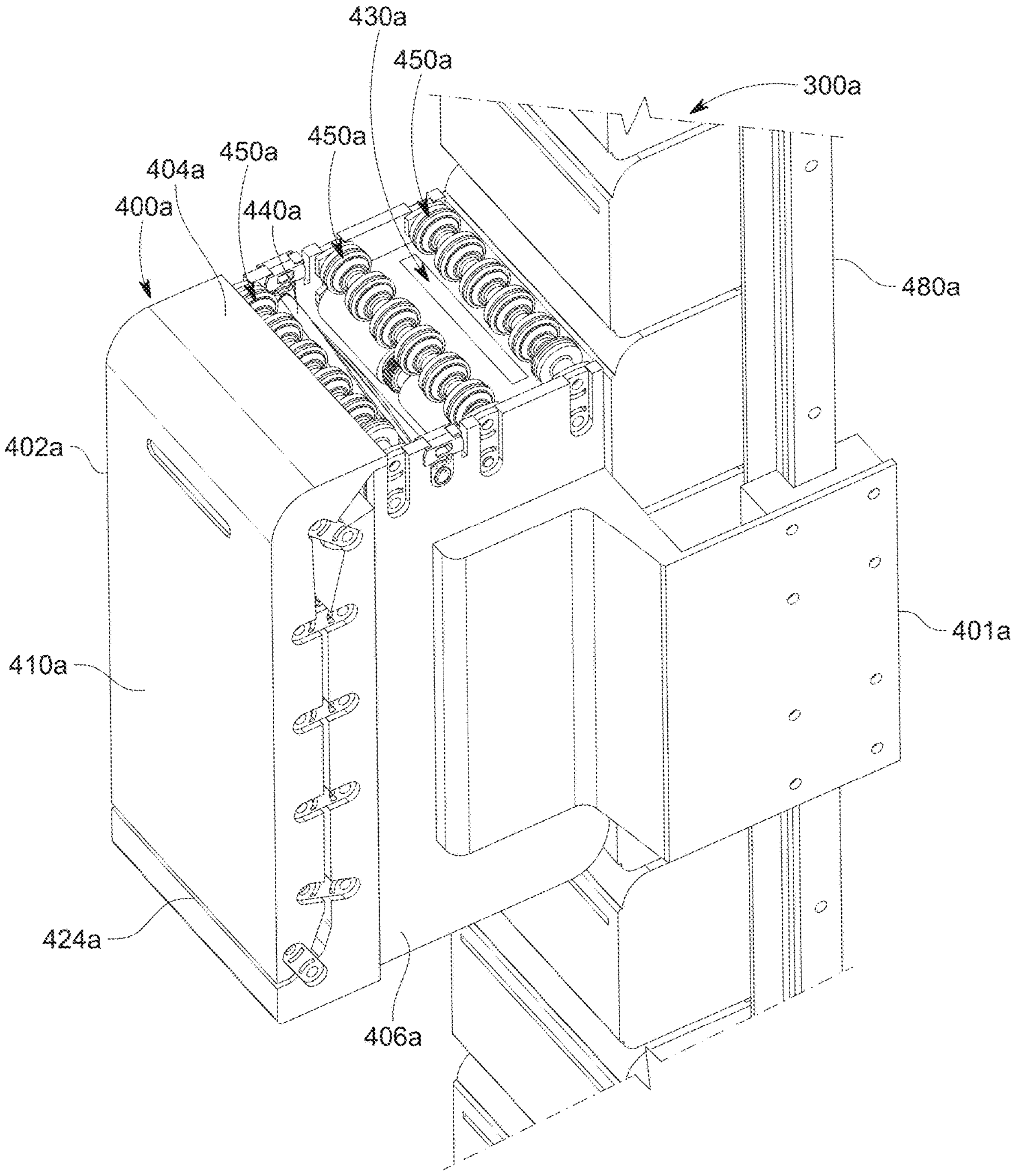
FIG. 5 is an enlarged fragmentary perspective view of the ticket drawer holder and the ticket burster of FIG. 4.
Figure 6:
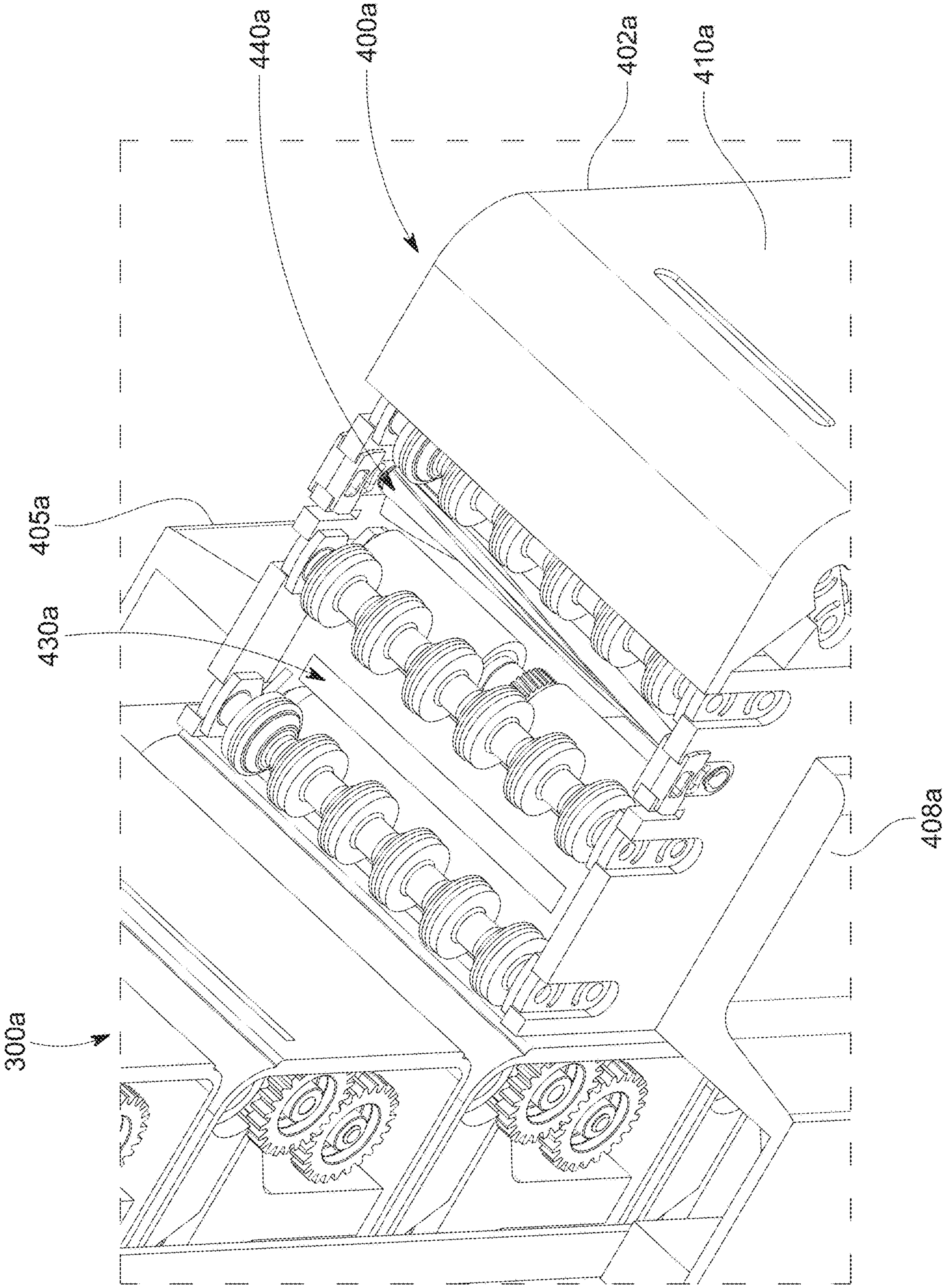
FIG. 6 is another enlarged fragmentary perspective view of the ticket drawer holder and the ticket burster of FIG. 4.
Figure 7:
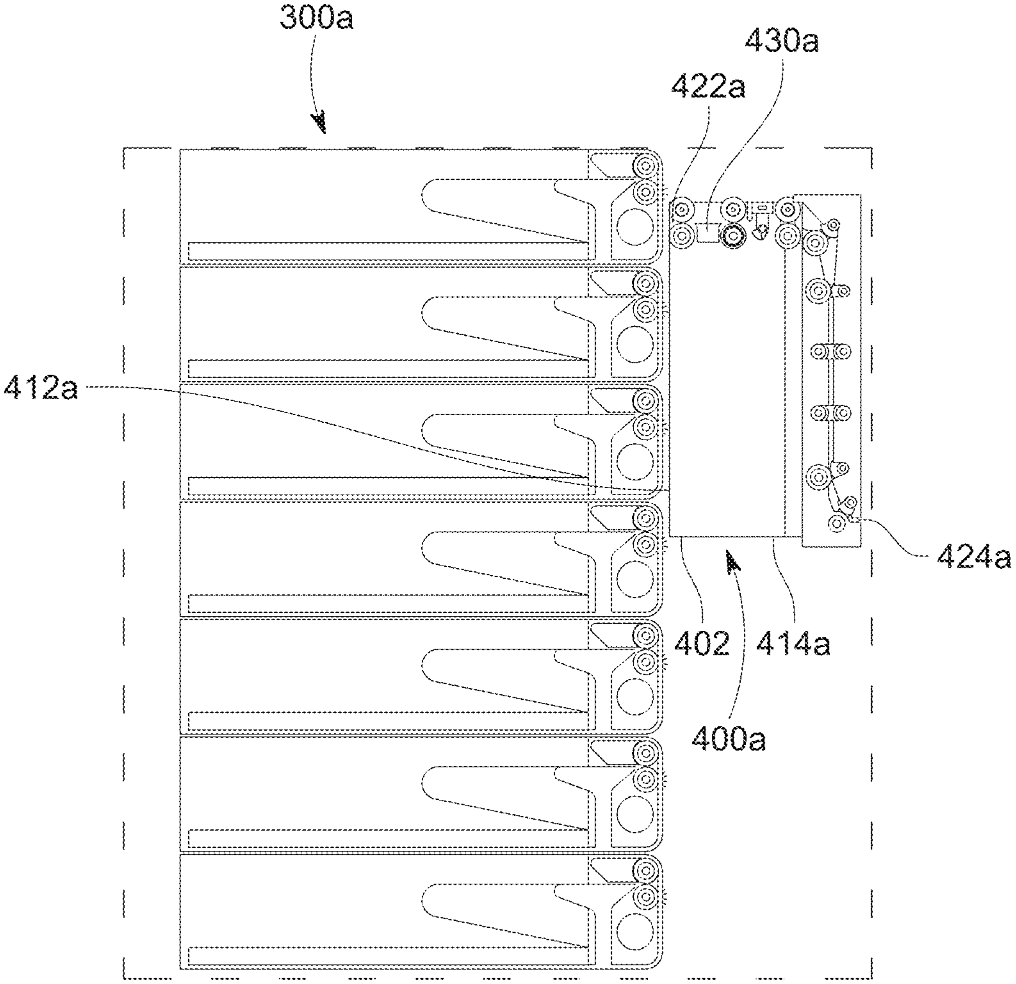
FIG. 7 is an enlarged fragmentary side view of the ticket drawer holder and the ticket burster of FIG. 4.
Figure 8:
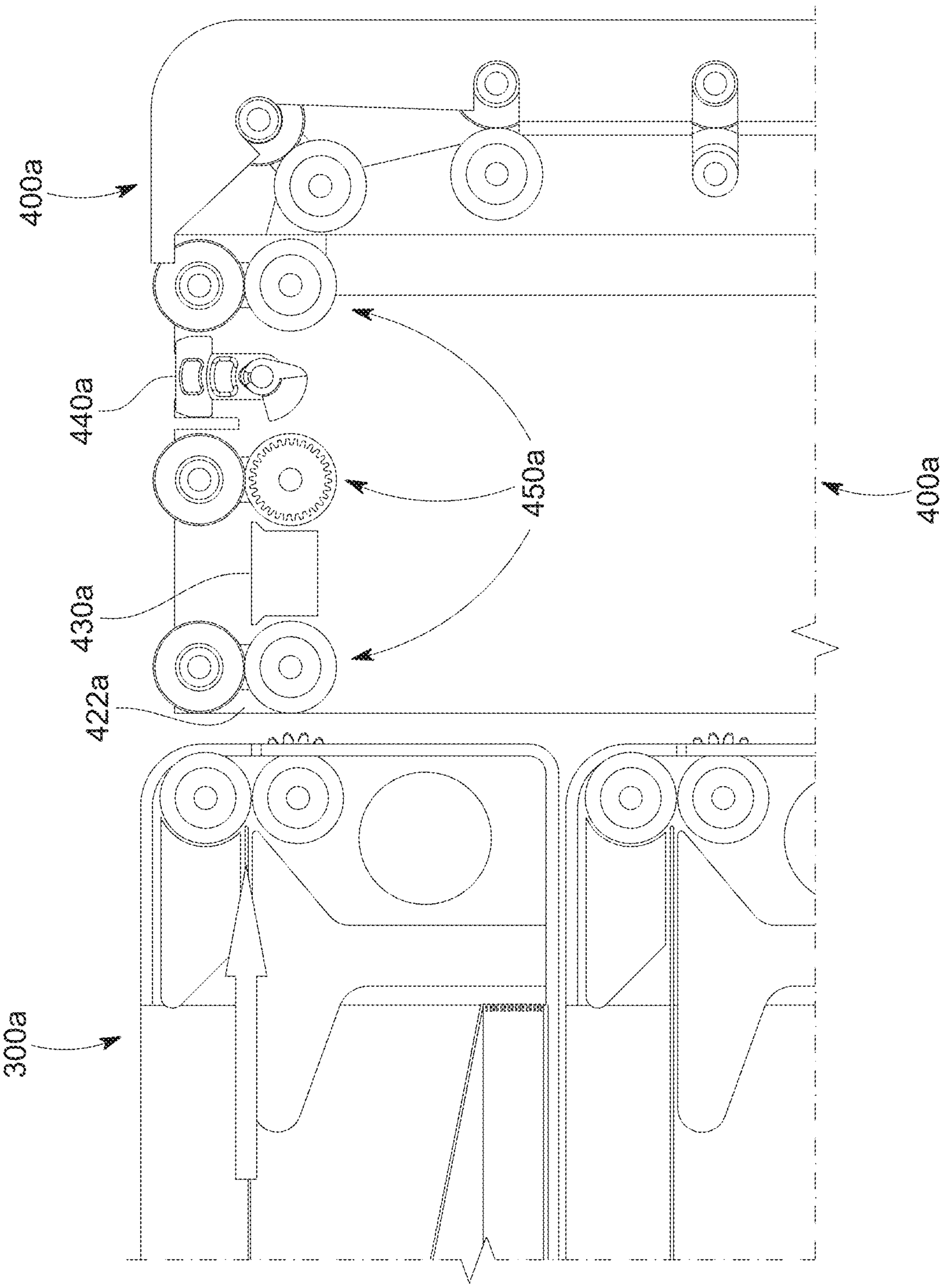
FIG. 8 is another enlarged fragmentary side view of the ticket drawer holder and the ticket burster of FIG. 4.

As best shown in FIGS. 5, 6, and 7, the example movable ticket burster 400*a* generally includes: (a) a burster housing 402*a*; (b) one or more burster supporter connecters (such as burster support connector 401*a* connecting the burster housing 402*a* and the burster supporter 480*a*); (c) a barcode reader 430*a* in and supported by the burster housing 402*a*; (d) a ticket cutter 440*a* in and supported by the burster housing 402*a*; I a plurality of ticket engagers 450*a* supported by the burster housing 402*a*; and (f) a burster controller (not shown). The size and configuration of the ticket burster can vary in accordance with the present disclosure. As indicated above, it should also be appreciated that in other embodiments, the ticket burster includes more than one barcode reader for determining barcode related data and barcode positional data. As also indicated above, it should also be appreciated that in other embodiments, the ticket burster includes one or more barcode readers for determining barcode related data, and one or more other sensors for determining barcode positional data.

More specifically, the burster housing 402*a* generally includes a top member 404*a*, spaced-apart side members (not labeled), a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive a lottery ticket from a ticket drawer of the ticket drawer holder 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*.

The ticket cutter 440*a* is positioned in the burster housing 402*a* and configured to rotate to cut the perforations attaching each lottery ticket that moves along the ticket movement path in the ticket burster 400*a* to the next lottery ticket of the continuous strip of lottery tickets received from the respective ticket drawer.

In other embodiments, the ticket burster 400*a* can be configured such that the burster housing 402*a* is rotatable about a horizontal axis to separate (via a tearing and/or twisting motion) each lottery ticket along the perforations connecting that lottery ticket to the next lottery ticket in the strip. In such embodiments, the ticket drawer may not need to withdraw the next lottery ticket of the strip or may only need to withdraw the next lottery ticket of the strip a relatively small distance. In such embodiments, the ticket burster may not need a ticket cutter.

It should be appreciated that the ticket burster 400*a* is thus configured to burst the perforations between the lottery ticket being dispensed and the next lottery ticket of the strip so as to enable the dispensed lottery ticket to be dispensed into the ticket receptacle 250. This prevents a person from improperly tearing a lottery ticket or being able to pull an extended number of lottery tickets from one of the ticket packs in one of the ticket drawers. It should be appreciated that the ticket burster 400*a* can be moved to a dispensing location for each lottery ticket dispensed, or for only certain lottery tickets dispensed. It should also be appreciated that the ticket burster can moved to a different location for any lottery ticket that is deemed to be bad or non-dispensable for any reason, and to deposit that ticket into a suitable rejection area.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the reflective sensor 430*a* (as further described below). In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the reflective sensor.

The example barcode reader 430*a* of the ticket burster 400*a* is positioned in and supported by the housing 402*a* of the ticket burster 400*a*. The barcode reader 430*a* extends transversely along the entire or substantially the entire width of the ticket burster 400*a* such that the barcode reader 430*a* can sense the one or more barcodes and the relative positions of the barcode(s) of each lottery ticket that moves through the ticket burster 400*a* as that lottery ticket moves above the barcode reader 430*a*. In this example embodiment, the barcode reader 430*a* is below the ticket movement path and thus scans upwardly toward the lottery ticket. In other alternative embodiments that are not shown, the barcode reader can be above the ticket movement path and thus scan downwardly toward the lottery ticket (which would be oriented to have the barcode facing upwardly).

The respective controller(s) receive and interpret the barcode related data in a conventional manner, and thus is not described in detail herein.

Figure 9:
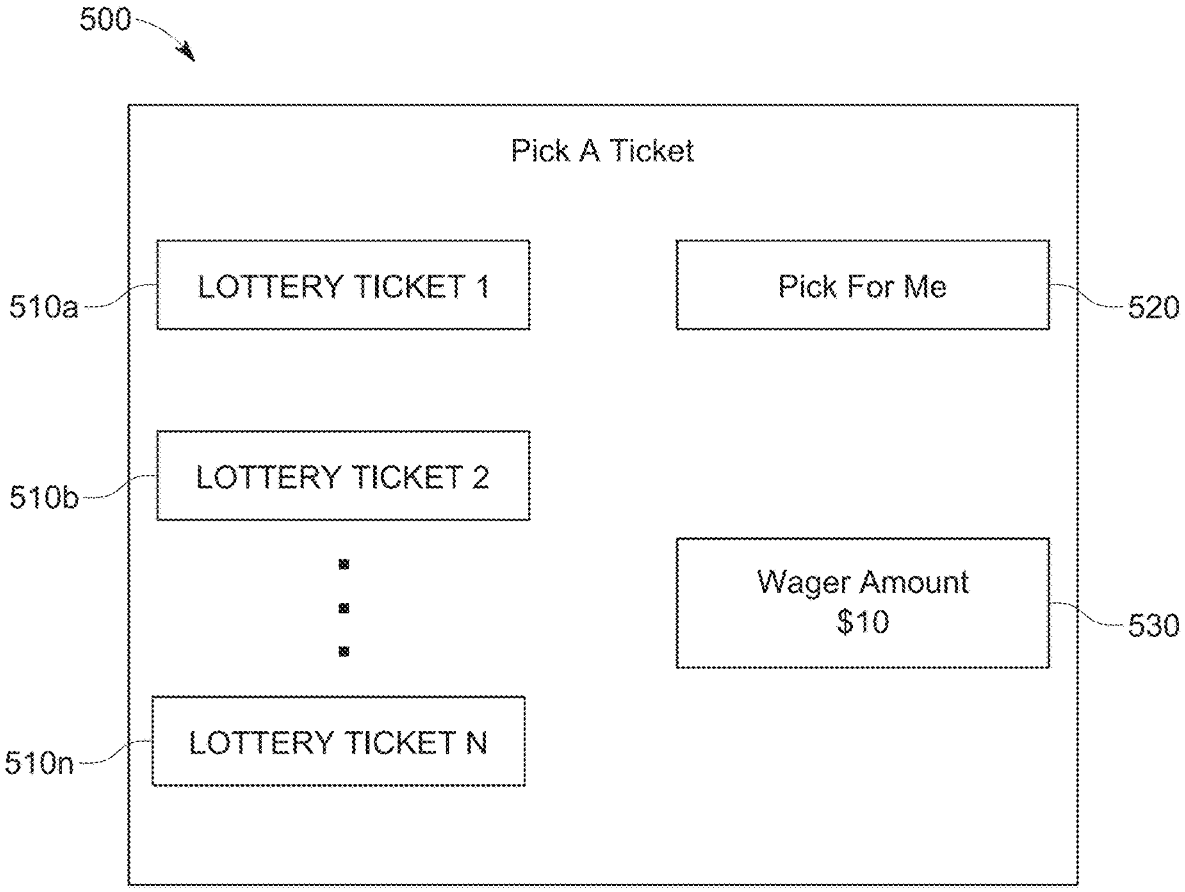
FIG. 9 is an image of an example user interface provided for selection of lottery tickets to be dispensed by the lottery ticket vending machine of FIG. 1A in accordance with one example embodiment of the present disclosure.

With respect to FIG. 9, in various embodiments, the controller of the ticket vending machine 100 is configured to cause the purchaser interface components 210 to display the user interface 500 from which a purchaser can make a selection for a ticket purchase. The user interface 500 includes a vending machine selected lottery ticket. Input button 520 (labeled “Pick For Me” in this example) associated with the vending machine selected lottery ticket and enables the purchaser to make one or more inputs via the purchaser interface components 210 requesting one or more vending machine selected instant lottery tickets based on one or more purchase parameters. The user interface 500 also includes a plurality of buttons 510*a*, 510*b*, . . . 510*n* that are respectively associated with particular ticket drawers of the plurality of ticket drawers 310. Responsive to a ticket selection input received from the purchaser via the purchaser interface components 210, the controller of the ticket vending machine 100 determines which of the buttons 520, 510*a*, 510*b*, . . . 510*n* has been selected by the purchaser. When the controller determines that one of the plurality of buttons 510*a*, 510*b*, . . . 510*n* has been selected, the controller causes the ticket burster 400*a* to dispense a lottery ticket from ticket drawer associated with the selected button. When the controller determines that the vending machine selected lottery ticket input button 520 has been selected, the controller selects an instant lottery ticket from available instant lottery tickets of the ticket drawer holders 300 based in part on one or more purchase parameters, causes the respective ticket burster such as ticket burster 400*a* to move to the ticket receipt position associated with the ticket drawer associated with the determined instant lottery ticket, and cause the ticket burster to dispense the determined instant lottery ticket from that ticket drawer.

The purchase parameters can include one or more of: (1) an amount (such as an amount of money) deposited by the purchaser into the lottery ticket vending machine 100 for the purchase of the vending machine selected lottery ticket(s); (2) an amount (such as an amount of money or price point for the lottery ticket(s)) selected by the purchaser for the vending machine selected lottery ticket(s) from a greater an amount (such as an amount of money) deposited by the purchaser into the ticket vending machine 100; (3) a quantity of vending machine selected lottery tickets; (4) a quantity of vending machine selected instant lottery tickets; (5) a quantity of vending machine selected draw lottery tickets; (6) a quantity of vending machine selected instant lottery tickets and a quantity of vending machine selected draw lottery tickets; (7) a type of instant game; (8) a new instant game, game type, and/or game parameter; and/or (9) one or more types of tickets desired by the purchaser. It should be appreciated that the vending machine can have one or more input buttons such as via the user interface for the player to make inputs for such parameters.

It should be appreciated that the lottery ticket vending machine can employ a shopping cart type of configuration where the lottery ticket vending machine selects one or more of the lottery tickets and the purchaser selects zero, one, or more lottery tickets. The lottery ticket vending machine displays indications of such selected lottery tickets and enables the player to confirm using an input device that the player wants to purchase such lottery tickets, or wants to change one or more of the such selected lottery tickets. This enables the player to confirm one or more or all of the vending machine selected lottery ticket.

In various embodiments, the controller is configured to select a maximum quantity of vending machine selected instant lottery tickets that can be purchased with the deposited amount of money by the player. In certain embodiments, the controller is configured to select a vending machine selected instant lottery ticket having a ticket price that is equal to the player deposited amount of money. In certain embodiments, the controller is configured to select a vending machine selected instant lottery ticket having a highest ticket price that is less than the deposited amount of money.

Figure 10:
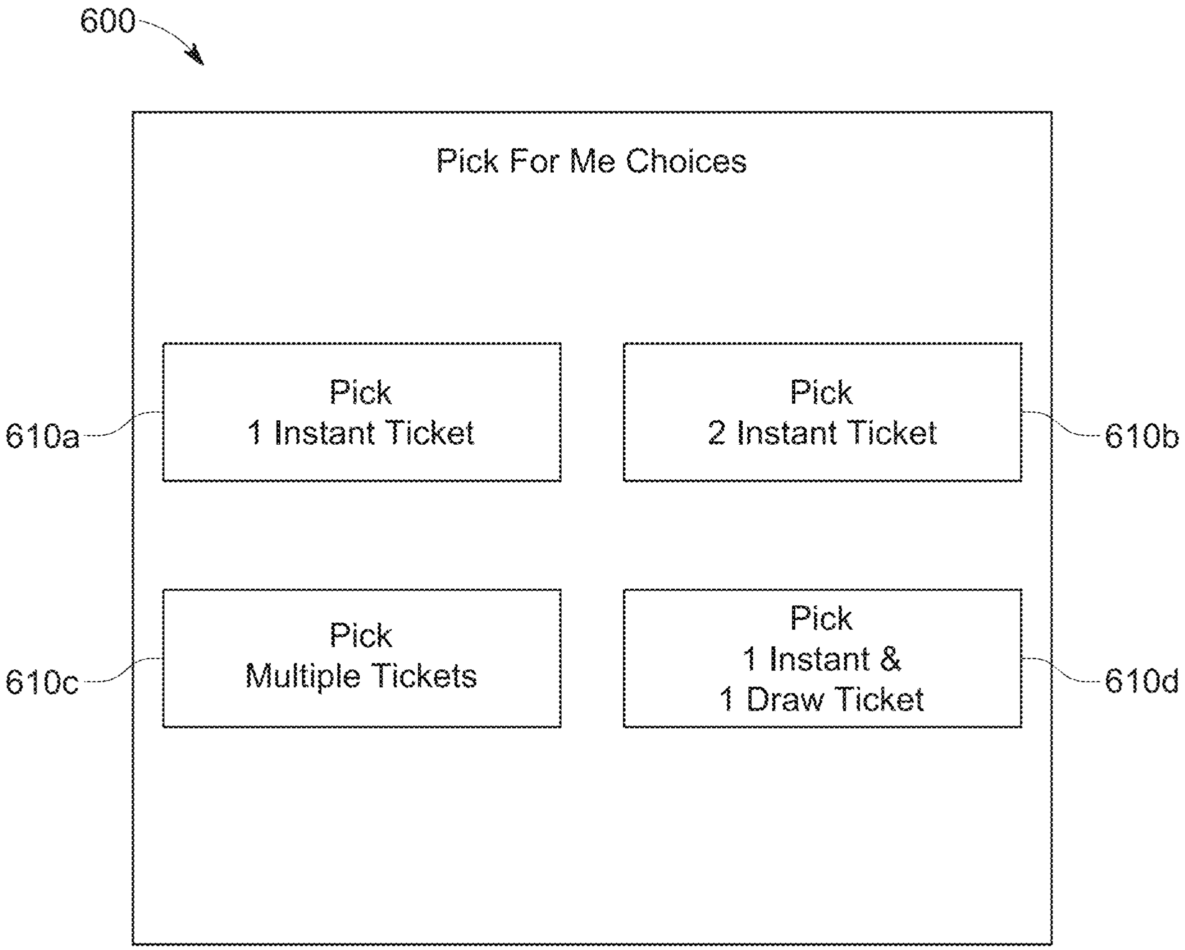
FIG. 10 is an image of an example user interface provided for user selection of a vending machine lottery ticket selection feature in accordance with one example embodiment of the present disclosure.

With respect to FIG. 10, in various embodiments, the controller of the ticket vending machine 100 is configured to cause the purchaser interface components 210 to display the user interface 600 from which a purchaser can make a selection for a ticket purchase. The user interface 600 includes a plurality of buttons, including buttons 610*a*,

610*b*, 610*c*, and 610*d*, that are associated with the vending machine selected lottery ticket feature and enable the purchaser to make one or more inputs via the purchaser interface components 210 requesting one or more vending machine selected instant lottery tickets based on one or more purchase parameters. In other words, selection of any of the buttons 610*a*, 610*b*, 610*c*, and 610*d* triggers the controller of the ticket vending machine 100 to select one or more vending machine selected lottery tickets and any associated random burster movement feature. Each of the plurality of buttons is associated with a respective quantity of instant lottery tickets to be determined by the controller of the lottery vending machine 100. In the embodiment shown in FIG. 10, the button 610*a* is associated with one instant lottery ticket to be determined by the controller, the button 610*b* is associated with two instant lottery tickets to be determined by the controller, and the button 610*c* is associated with two or more instant lottery tickets to be determined by the controller (e.g., a quantity to be determined in a subsequent user interface, not shown). In various embodiments, one or more of the plurality of buttons are associated with a quantity of instant lottery tickets to be determined by the controller and also associated with a quantity of non-instant lottery tickets, such as draw tickets. In the embodiment shown in FIG. 10, the button 610*d* is associated with one instant lottery ticket to be determined by the controller and one draw ticket to be determined by the controller (i.e., a lottery ticket with a sequence of random numbers determined by the controller for a future lottery drawing).

For each of the quantity of vending machine selected instant lottery tickets to be determined by the controller, the controller of the ticket vending machine 100 performs the selection and determines any random burster movement. This includes: (1) determining a vending machine selected instant lottery ticket from available instant lottery tickets in the plurality of ticket drawers 310*a*; (2) causing a randomly determined movement of the ticket burster 400*a* associated with that vending machine selected instant lottery ticket (or the ticket burster 400*a* associated with the ticket drawer associated with that vending machine selected instant lottery ticket); (3) causing the ticket burster 400*a* associated with the vending machine selected instant lottery ticket to move to the ticket receipt position associated with that ticket drawer; and (4) causing the ticket burster associated with that ticket drawer to obtain and dispense the vending machine selected instant lottery ticket from that ticket drawer. In various embodiments, the random movement of the ticket burster 400*a* is independent of the movement of the ticket burster 400*a* to the ticket receipt position. In various embodiments, the movement of the ticket burster 400*a* to the ticket receipt position is included within the random movement.

In various embodiments, the controller of the ticket vending machine 100 randomly determines the vending machine selected instant lottery ticket and as such, the purchaser does not know which vending machine selected instant lottery ticket has been selected. In various such embodiments, the movement of the ticket burster 400*a* is a direct movement to the ticket drawer associated with the vending machine selected instant lottery ticket, but the direct movement appears to be random to the purchaser because the purchaser does not know where the ticket burster 400*a* will stop to dispense a lottery ticket. For example, the controller of the ticket vending machine 100 can cause the ticket burster 400*a* to move from a current position directly to the ticket drawer associated with the vending machine selected instant lottery ticket. The current position can be any of a top-most position associated with the ticket drawer holder 300*a*, a default position of the ticket burster 400*a*, a ticket dispensing position in alignment with the ticket collection receptacle 250, or other suitable position. For the ticket drawer holder 300*a* having a single column of ticket drawers as shown in the figures, the direct movement of the burster controller 400*a* is a movement in only a single direction, such as only an up direction or only a down direction towards the ticket drawer associated with the vending machine selected instant lottery ticket. In other embodiments where the controller is configured to move the ticket burster 400*a* in both the vertical (e.g., up and down) directions and horizontal (e.g., left and right) directions, the direct movement of the ticket burster 400*a* includes a first movement in only one of the up and down directions and a second movement in only one of the left and right directions.

In other such embodiments for the randomly determined vending machine selected instant lottery ticket, the controller of the ticket vending machine 100 performs an indirect random movement to the ticket drawer associated with the vending machine selected instant lottery ticket. The indirect random movement includes a sequence of distinct movements of the ticket burster 400*a* in different directions, followed by a movement of the ticket burster 400*a* to that ticket drawer. Each movement can be associated with a respective duration of that movement, a respective distance of that movement, and/or other suitable characteristic that defines an end of that movement. One example sequence includes a first movement in the up direction, a second movement in the down direction, a third movement in the up direction, a fourth movement in the down direction, followed by a dispensing movement to the ticket receipt position of that ticket drawer for dispensing of the lottery ticket. In various embodiments, the sequence can include one, two, three, or more movements before the dispensing movement. In various embodiments, the sequence is associated with a particular duration, for example, five seconds, 10 seconds, or another suitable duration. In various such embodiments, the controller randomly determines the duration of the sequence.

In some examples, the sequence includes one or more pauses in movement of the ticket burster 400*a* at one or more intermediate positions. The pause in movement can have any suitable duration, such as one second, three seconds, etc. For example, the controller of the ticket vending machine 100 can cause the ticket burster 400*a* to move from a current position to one or more intermediate positions and then to the ticket drawer associated with the vending machine selected instant lottery ticket. One or more of the intermediate positions can correspond to ticket receipt positions of ticket drawers that have not been selected by the controller, which can create excitement for the purchaser when the ticket burster 400*a* pauses at a ticket drawer that holds instant lottery tickets with high potential rewards.

In various embodiments, the controller of the ticket vending machine 100 randomly determines the sequence for the indirect random movement. For example, the controller randomly determines a sequence for the indirect random movement, including: a plurality of movements; zero, one, or more intermediate positions; and zero, one, or more pauses. In various such embodiments, the controller randomly determines a speed for one or more movements of the sequence (e.g., a fast movement, a slow movement, an increasing speed, a decreasing speed, etc.). In various such embodiments, the controller randomly determines different ticket receipt positions as the intermediate positions for the sequence. In various such embodiments, the controller randomly determines a duration for one or more pauses of the sequence (e.g., a short duration of 0.5 seconds, a long duration of three seconds, etc.). In various embodiments, the controller randomly determines a respective quantity for each of the plurality of movements, the intermediate positions, and the pauses.

In certain other embodiments for the randomly determined sequence, the controller of the ticket vending machine 100 randomly determines the sequence by selecting from among a plurality of predetermined sequences that are stored in a memory associated with the controller.

In various embodiments, the controller of the ticket vending machine 100 determines the ticket drawer from the plurality of drawers with a non-random determination. For example, the controller can receive a signal from a remote server that indicates the ticket drawer for the random burster movement feature. In another example, the controller can determine the ticket drawer based on the occurrence or non-occurrence of one or more events (e.g., whether a threshold quantity of lottery tickets have been dispensed, whether a threshold time interval has elapsed, etc.). In various such embodiments, the random movement of the ticket burster 400*a* is a direct movement (described above) to the ticket drawer associated with the vending machine selected instant lottery ticket, but the direct movement appears to be random to the purchaser because the purchaser does not know where the ticket burster 400*a* will stop to dispense a lottery ticket. In various such embodiments, the random movement of the ticket burster 400*a* is an indirect random movement (described above) to that ticket drawer.

In various embodiments, as part of the random burster movement feature, the controller of the ticket vending machine 100 is configured to cause a random movement of one or more other ticket bursters that are not associated with the vending machine selected instant lottery ticket, in addition to the random movement of the ticket burster 400*a* associated with the vending machine selected instant lottery ticket. In such embodiments, the controller is configured to determine the random movement of the other ticket bursters as described above. In such embodiments, the controller does not cause the other ticket bursters to dispense any lottery tickets.

In various embodiments, the ticket vending machine 100 includes one or more lights (not shown) and displays, such as colorful display lights and LCDs that provide enhanced visual appeal of the ticket vending machine 100. In various such embodiments, the controller of the ticket vending machine 100 can determine the sequence of distinct movements to also include activation and/or deactivation of the lights and displays at suitable times and for suitable durations.

In various embodiments, the ticket vending machine 100 includes one or more speakers (not shown). In various embodiments, the controller of the ticket vending machine 100 can determine the sequence of distinct movements to also include playback of audio signals via the speakers at suitable times and for suitable durations.

In various embodiments, the purchaser interface components 210 of the ticket vending machine 100 include one or more buttons that are dedicated to the random burster movement feature. For example, one or more of the user interface buttons 520, 610*a*, 610*b*, 610*c*, 610*d* can be implemented as a separate, physical button of the purchaser interface components 210.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100 using the vending machine selected lottery ticket feature. Responsive to and after the purchaser selects the vending machine selected lottery ticket input (from the plurality of different lottery tickets inputs and selection features available from the ticket vending machine 100) using the purchaser interface component(s) 210 and specifically using one or more of the input devices and one or more of the payment acceptors to select and pay for a lottery ticket associated with the vending machine selected lottery ticket input, the ticket vending machine 100 determines a vending machine selected instant lottery ticket from available instant lottery tickets of the plurality of ticket drawers of the ticket vending machine 100. The vending machine 100 then causes a randomly determined movement of the ticket burster 400*a* associated with the vending machine selected instant lottery ticket, and causes the ticket burster 400*a* to obtain and dispense a lottery ticket from that ticket drawer into the ticket collection receptacle 250.

More specifically, this includes: (1) receiving a ticket selection input from the purchaser via the purchaser interface component 210; (2) determining whether the ticket selection input is a selection of the vending machine selected lottery ticket input; (3) responsive to the selection of the vending machine selected lottery ticket input, determining a ticket drawer from the plurality of ticket drawers; (4) causing a random movement of the ticket burster 400*a* associated with the ticket drawer associated with the vending machine selected instant lottery ticket; (5) moving the ticket burster 400*a* into a ticket receipt position associated with and in alignment with that ticket drawer; (6) causing the leading lottery ticket of that ticket drawer to be fed into the ticket inlet 422*a* of the ticket burster 400*a* (with the front face of the lottery ticket facing upwardly); (7) causing the ticket engagers 450*a* to engage and cause that lottery ticket to move along the ticket movement path of the ticket burster 400*a*; (8) at the appropriate time when the barcode of that lottery ticket passes through a scan area above the barcode reader 430*a*, causing the barcode reader 430*a* to read the barcode(s) of that lottery ticket, and send barcode related signals to the burster controller and/or the controller of the ticket vending machine 100; (9) at the appropriate time when the perforations connecting that instant lottery ticket to the next lottery ticket of that strip are aligned with the ticket cutter 440*a*, causing the ticket cutter 440*a* to cut the perforations and thus separate that lottery ticket from the next lottery ticket in the strip; (10) causing the ticket drawer to retract any portion of that next lottery ticket of the strip from the ticket burster 400*a*; (11) causing the ticket burster 400*a* to move into alignment with the ticket collection receptacle 250; and (12) causing the ticket engagers 450*a* to move the separated lottery ticket along the ticket movement path toward and out of the ticket outlet 424*a*, and into the ticket collection receptacle 250. The method can include the controller of the ticket vending machine 100 also sending suitable data related to the dispensed lottery ticket to a central lottery server (not shown) for verification of that lottery ticket for possible subsequent redemption.

It should be appreciated that the vending machine selected lottery ticket features and the random burster movement features can be employed in other suitable lottery ticket vending machines, which can operate in different suitable manners.

It should be appreciated from the above that various embodiments of the present disclosure provide a lottery ticket vending machine comprising: (1) a housing; (2) a ticket drawer holder positioned in the housing, the ticket drawer holder comprising a plurality of ticket drawers, each of the ticket drawers configured to hold a pack of instant lottery tickets; (3) a ticket receptacle supported by the housing; (4) a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and (5) a controller configured to: (a) randomly determine a vending machine selected instant lottery ticket from available instant lottery tickets in the plurality of ticket drawers, (b) cause the ticket burster to move to the ticket receipt position associated with the ticket drawer associated with the vending machine selected instant lottery ticket, and (c) cause the ticket burster to dispense the vending machine selected instant lottery ticket from the ticket drawer associated with the vending machine selected instant lottery ticket. In various embodiments, the lottery ticket vending machine is configured to cause an indirect random movement of the ticket burster before causing the ticket burster to move to the ticket receipt position associated with the vending machine selected instant lottery ticket. In various embodiments, the lottery ticket vending machine is configured to cause a sequence of distinct movements of the ticket burster in different directions before causing the ticket burster to move to the ticket receipt position associated with the vending machine selected instant lottery ticket. In various embodiments, the lottery ticket vending machine is configured to randomly determine the sequence from a plurality of predetermined sequences. In various embodiments, the lottery ticket vending machine is configured to randomly determine movement speeds for each of the plurality of movements. In various embodiments, the lottery ticket vending machine is configured to cause a sequence of distinct movements of the ticket burster in different directions and one or more pauses in movement of the ticket burster at one or more intermediate positions before causing the ticket burster to move to the ticket receipt position associated with the vending machine selected instant lottery ticket. In various embodiments, the intermediate positions are ticket receipt positions. In various embodiments, the lottery ticket vending machine is configured to cause one or more movements of a second ticket burster during the movements of the ticket burster. In various embodiments, the lottery ticket vending machine is configured to cause one or more movements of a plurality of other ticket bursters during the movements of the ticket burster.

It should be further appreciated from the above that various embodiments of the present disclosure provide a lottery ticket vending machine comprising: (1) a housing; (2) a ticket drawer holder positioned in the housing, the ticket drawer holder comprising a plurality of ticket drawers, each of the ticket drawers configured to hold a pack of instant lottery tickets; (3) a ticket receptacle supported by the housing; (4) a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and (5) a controller configured to: (a) randomly determine a vending machine selected instant lottery ticket held by one the plurality of ticket drawers from a plurality of different lottery tickets held by the plurality of ticket drawers, (b) cause a randomly determined sequences of movements of the ticket burster, (c) cause the ticket burster to move to the ticket receipt position associated with the ticket drawer that holds the vending machine selected instant lottery ticket, and (d) cause the ticket burster to dispense the vending machine selected instant lottery ticket from that drawer. In various embodiments, the random determination of the vending machine selected instant lottery ticket is based on a purchase parameter. In various embodiments, the purchase parameter comprises a purchase amount for the vending machine selected instant lottery ticket. In various embodiments, the purchase parameter comprises a quantity of vending machine selected instant lottery tickets. In various embodiments, the purchase parameter comprises a type of lottery ticket.

It should be further appreciated from the above that various embodiments of the present disclosure provide a lottery ticket vending machine comprising: (1) a housing; (2) a ticket drawer holder positioned in the housing, the ticket drawer holder comprising a plurality of ticket drawers, each of the ticket drawers configured to hold a pack of instant lottery tickets; (3) a ticket receptacle supported by the housing; (4) a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and (5) a controller configured to: (a) determine a non-randomly determined vending machine selected instant lottery ticket from available instant lottery tickets in the plurality of ticket drawers, (b) cause a randomly determined movement of the ticket burster, (c) cause the ticket burster to move to the ticket receipt position associated with the determined vending machine selected instant lottery ticket, and (d) cause the ticket burster to dispense the vending machine selected instant lottery ticket. In various embodiments, the determination of the vending machine selected instant lottery ticket is based on a purchase parameter. In various embodiments, the purchase parameter comprises a purchase amount for the vending machine selected instant lottery ticket. In various embodiments, the purchase parameter comprises a type of lottery ticket. In various embodiments, the lottery ticket vending machine is configured to cause a sequence of distinct movements of the ticket burster in different directions as part of the random movement of the ticket burster. In various embodiments, the lottery ticket vending machine is configured to randomly determine the movement of the ticket burster from a plurality of predetermined sequences.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:

a housing;

a ticket drawer holder positioned in the housing, the ticket drawer holder comprising a plurality of ticket drawers, each of the ticket drawers configured to hold a pack of instant lottery tickets;

a ticket receptacle supported by the housing;

a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle;

a controller comprising a processor and memory device that stores a plurality of instructions, which when executed by the processor cause the processor to:

randomly determine a vending machine selected instant lottery ticket from available instant lottery tickets in the plurality of ticket drawers, cause the ticket burster to move to the ticket receipt position associated with the ticket drawer associated with the vending machine selected instant lottery ticket, and cause the ticket burster to dispense the vending machine selected instant lottery ticket from the ticket drawer associated with the vending machine selected instant lottery ticket.

2. The lottery ticket vending machine of claim 1, wherein the plurality of instructions, when executed by the processor, cause the processor to cause an indirect random movement of the ticket burster before causing the ticket burster to move to the ticket receipt position associated with the vending machine selected instant lottery ticket.

3. The lottery ticket vending machine of claim 1, wherein the plurality of instructions, when executed by the processor, cause the processor to cause a sequence of distinct movements of the ticket burster in different directions before causing the ticket burster to move to the ticket receipt position associated with the vending machine selected instant lottery ticket.

4. The lottery ticket vending machine of claim 3, wherein the plurality of instructions, when executed by the processor, cause the processor to randomly determine the sequence from a plurality of predetermined sequences.

5. The lottery ticket vending machine of claim 3, wherein the plurality of instructions, when executed by the processor, cause the processor to randomly determine movement speeds for each of the plurality of movements.

6. The lottery ticket vending machine of claim 1, wherein the plurality of instructions, when executed by the processor, cause the processor to cause a sequence of distinct movements of the ticket burster in different directions and one or more pauses in movement of the ticket burster at one or more intermediate positions before causing the ticket burster to move to the ticket receipt position associated with the vending machine selected instant lottery ticket.

7. The lottery ticket vending machine of claim 6, wherein the intermediate positions are ticket receipt positions.

8. The lottery ticket vending machine of claim 1, wherein the plurality of instructions, when executed by the processor, cause the processor to cause one or more movements of a second ticket burster during the movements of the ticket burster.

9. The lottery ticket vending machine of claim 1, wherein the plurality of instructions, when executed by the processor, cause the processor to cause one or more movements of a plurality of other ticket bursters during the movements of the ticket burster.

10. A lottery ticket vending machine comprising:

a housing;

a ticket drawer holder positioned in the housing, the ticket drawer holder comprising a plurality of ticket drawers, each of the ticket drawers configured to hold a pack of instant lottery tickets;

a ticket receptacle supported by the housing;

a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and a controller comprising a processor and memory device that stores a plurality of instructions, which when executed by the processor cause the processor to:

randomly determine a vending machine selected instant lottery ticket held by one the plurality of ticket drawers from a plurality of different lottery tickets held by the plurality of ticket drawers, cause a randomly determined sequences of movements of the ticket burster, cause the ticket burster to move to the ticket receipt position associated with the ticket drawer that holds the vending machine selected instant lottery ticket, and cause the ticket burster to dispense the vending machine selected instant lottery ticket from that drawer.

11. The lottery ticket vending machine of claim 10, wherein the random determination of the vending machine selected instant lottery ticket is based on a purchase parameter.

12. The lottery ticket vending machine of claim 11, wherein the purchase parameter comprises a purchase amount for the vending machine selected instant lottery ticket.

13. The lottery ticket vending machine of claim 11, wherein the purchase parameter comprises a quantity of vending machine selected instant lottery tickets.

14. The lottery ticket vending machine of claim 11, wherein the purchase parameter comprises a type of lottery ticket.

15. A lottery ticket vending machine comprising:

a housing;

a ticket drawer holder positioned in the housing, the ticket drawer holder comprising a plurality of ticket drawers, each of the ticket drawers configured to hold a pack of instant lottery tickets;

a ticket receptacle supported by the housing;

a ticket burster positioned in the housing, the ticket burster movable to a plurality of different ticket receipt positions, each different ticket receipt position associated with and in alignment with a different one of the plurality of ticket drawers, wherein in each ticket receipt position the ticket burster is configured to receive from the ticket drawer associated with that ticket receipt position an instant lottery ticket attached to a next instant lottery ticket, separate the instant lottery ticket from the next instant lottery ticket, and dispense the instant lottery ticket into the ticket receptacle; and a controller comprising a processor and memory device that stores a plurality of instructions, which when executed by the processor cause the processor to:

determine a non-randomly determined vending machine selected instant lottery ticket from available instant lottery tickets in the plurality of ticket drawers, cause a randomly determined movement of the ticket burster, cause the ticket burster to move to the ticket receipt position associated with the determined vending machine selected instant lottery ticket, and cause the ticket burster to dispense the vending machine selected instant lottery ticket.

16. The lottery ticket vending machine of claim 15, wherein the determination of the vending machine selected instant lottery ticket is based on a purchase parameter.

17. The lottery ticket vending machine of claim 16, wherein the purchase parameter comprises a purchase amount for the vending machine selected instant lottery ticket.

18. The lottery ticket vending machine of claim 16, wherein the purchase parameter comprises a type of lottery ticket.

19. The lottery ticket vending machine of claim 16, wherein the plurality of instructions, when executed by the processor, cause the processor to cause a sequence of distinct movements of the ticket burster in different directions as part of the random movement of the ticket burster.

20. The lottery ticket vending machine of claim 16, wherein the plurality of instructions, when executed by the processor, cause the processor to randomly determine the movement of the ticket burster from a plurality of predetermined sequences.

* * * * *